United States Patent [19]
Key et al.

[11] 4,101,784
[45] Jul. 18, 1978

[54] COLOR MARK DETECTOR

[75] Inventors: Paul Franklyn Key, San Martin; Anthony Ross Lazzara, Portola Valley, both of Calif.

[73] Assignee: Scientific Technology Incorporated, Mountain View, Calif.

[21] Appl. No.: 809,542

[22] Filed: Jun. 24, 1977

Related U.S. Application Data

[62] Division of Ser. No. 712,607, Aug. 9, 1976, Pat. No. 4,047,023.

[51] Int. Cl.² ............................................. G06K 7/10
[52] U.S. Cl. ............................. 250/555; 235/454; 250/214 RC
[58] Field of Search ............ 250/214 RC, 214 B, 559, 250/555, 566, 568; 235/61.11 E

[56] References Cited

U.S. PATENT DOCUMENTS

| 3,761,725 | 9/1973 | Meyer | 250/555 |
|---|---|---|---|
| 3,789,215 | 1/1974 | Penny | 250/555 |
| 3,949,233 | 4/1976 | Gluck | 250/555 |
| 4,029,957 | 6/1977 | Betz et al. | 250/214 B |

*Primary Examiner*—David C. Nelms
*Attorney, Agent, or Firm*—Flehr, Hohbach, Test, Albritton & Herbert

[57] ABSTRACT

A detector for marks having a color which contrasts with the mark background employs a solid state light source projecting a light beam having a plurality of wave length components corresponding to a plurality of colored light wave lengths. The light beam may approach the appearance of white light. A pulse modulated detector or sensor is used for receiving light reflected from colored surfaces having contrasting colored marks thereon, wherein high ambient light level rejection is obtained and high signal to noise ratio is provided in a sensor output. The sensor output is gated to eliminate between pulse noise, and the gated output is integrated to obtain a reference signal to which the gated pulse is continuously compared. An increase or decrease in signal is used to provide a light or dark mark indication respectively as a result of the comparison. Feedback from the output suppresses signal instability which may exist at the edges of the detection threshold. Since the comparator reference is self-adjusting to the background condition on the surface carrying the marks, the detection capability is dependent upon detector sweep speed relative to the surface.

3 Claims, 6 Drawing Figures

COLOR MARK DETECTOR

This is a division, of application Ser. No. 712,607 filed Aug. 9, 1976, now U.S. Pat. No. 4,047,023.

BACKGROUND OF THE INVENTION

This invention relates to a detector for colored registration marks on contrasting colored backgrounds, and more particularly to such a detector which self-adjusts to the degree of darkness or lightness of the background for detecting light or dark marks thereon respectively.

Present sensors for discriminating between a colored mark on a colored background utilize incandescent lamp light sources which require high power, have limited life and are not optimumly suited for pulsed light detection systems because of the particular afterglow or light response limitations associated therewith. Moreover, such systems must be manually adjusted to calibrate them for each new background color and shade relative to the mark color and shade. Relatively high power consumption levels occur in the incandescent lamp light sources and detector output signals in prior art detectors have low signal to noise ratios for relatively dark contrasting marks and backgrounds. Output signal instability exists due to instability at the edges of the detector threshold.

It is clear that a low power, high sensitivity, self-adjusting mark detector is desirable for a variety of applications, where either dark shade marks on a light shade background or light shade marks on a dark shade background are to be detected.

SUMMARY AND OBJECTS OF THE INVENTION

The mark detector for sensing colored marks on contrasting colored backgrounds utilizes a light source and a pulsed light detector in a common framework. The light source produces a light beam having a number of wave length components corresponding to a number of visible light colors. The light beam is projected through an aperture for reflection from a surface carrying the background and the marks thereon. The reflected light is received by the light sensor at a pulsed frequency which is synchronous with a pulsed excitation frequency for the light source. An integrator is coupled to receive the light sensor output and to provide an integral output which is coupled to one input of a comparator. Another input on the comparator is coupled to receive the pulsed output signal and the two comparator inputs are continuously compared, providing an output from the comparator when a predetermined difference in levels exists between the integral and sensor outputs. The comparator output is conditioned to present a color mark output when a surface color which contrasts with the surface background color passes through the light beam.

In general it is an object of the present invention to provide a color mark detection system having a low power consumption, fast response to color change and automatic adjustment for background colors and shades.

Another object of the present invention is to provide a color mark detection system which is substantially insensitive to noise at the edges of the mark detection threshold.

Another object of the present invention is to provide a color mark detection system with the capability of detecting dark marks on a light background or light marks on a dark background.

Another object of the present invention is to provide a color mark detection system which provides an output indicative of the relative darkness between the marks and the contrasting background.

Another object of the present invention is to provide a color mark detector wherein a self-contained solid state light source provides a beam having characteristic approaching those of white light.

Additional objects and features of the invention will appear from the following description in which the preferred embodiment has been set forth in detail in conjunction with the accompanying drawings.

DESCRIPTION OF THE PREFERRED EMBODIMENT

Figure 1:
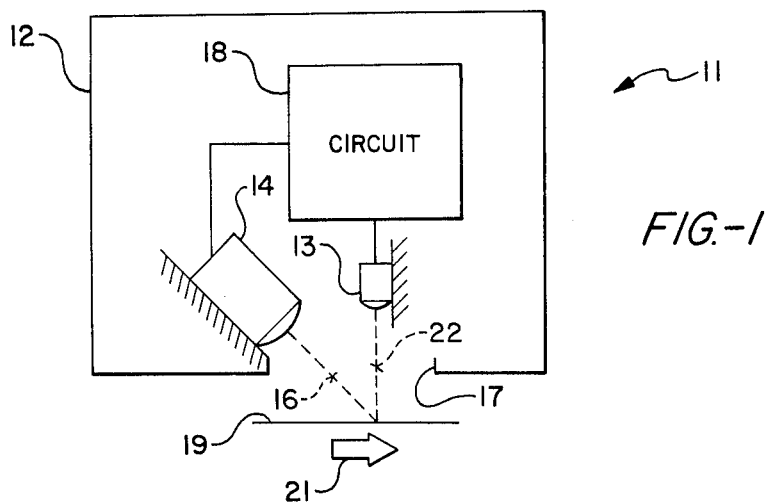
FIG. 1 is a simplified mechanical diagram of the structure in the color mark detector.

The color mark detection device 11 of FIG. 1 has a framework 12 functioning as a mount and an enclosure in which is mounted a light receiver 13 which, with associated circuitry, may be the type disclosed in U.S. Pat. No. 3,867,628 for a Pulsed Light Receiver and Method. A light source 14 is also shown mounted within framework 12 directing a light beam 16 through an aperture 17 in framework 12. A circuit 18 is associated with light receiver 13 and light source 14 and provides for interconnections therebetween. A surface 19 is shown passing before aperture 17 in the direction shown by arrow 21. Surface 19 is such as to reflect components of light beam 16 toward light receiver 13 as seen at reflected light beam 22. Surface 19 carries marks thereon which have a color contrasting with the background on surface 19.

Surface 19 is subject to "flutter" or lateral motion as it moves in the direction of arrow 21. This "flutter" moves surface 19 closer to or farther away from light receiver 13. A signal variation may therefore occur from light receiver 13. To reduce the signal variation the focal point for the optics included in light source 14 and light receiver 13 is set at the mid-point of lateral excursion of surface 19 as it moves. Thus, surface 19 will move closer to the light receiver 13 causing a peak variation in signal therefrom and further from light receiver 13 causing a light receiver signal reduction. By working on either side of the optics focal point light receiver signal variation is reduced. Color contrast on surface 19 is allowed to produce a considerably larger signal change than that produced by surface "flutter".

Figure 2:
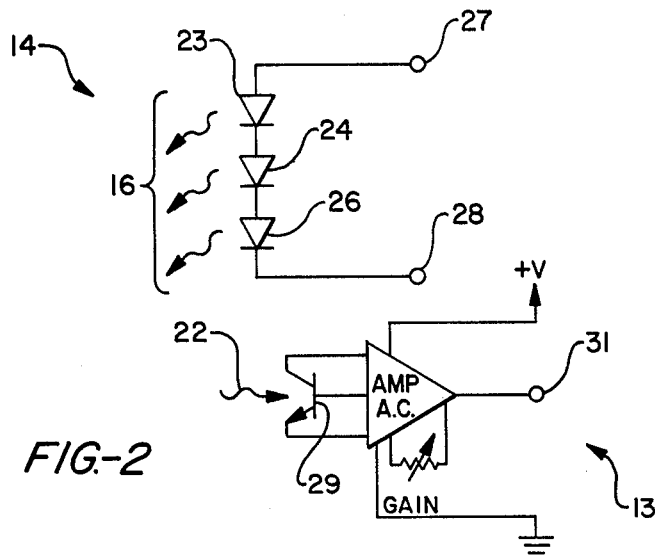
FIG. 2 is a block diagram of a light source and light sensor included in the color mark detector.

Turning now to FIG. 2 the light source 14 is shown in simplified form as including a high efficiency red light emitting diode (LED) 23, a yellow LED 24 and a green LED 26 connected in series between power terminals 27 and 28. Light receiver on sensor 13 which is described herein as a pulsed light receiver disclosed in U.S. Pat. No. 3,867,628 mentioned above, is shown having a photosensitive transistor 29 for receiving reflected light beam 22. As described in the referenced patent, light sensor 13 with circuit 18 provides a sensor output at terminal 31, which is indicative of received light energy.

Figure 3:
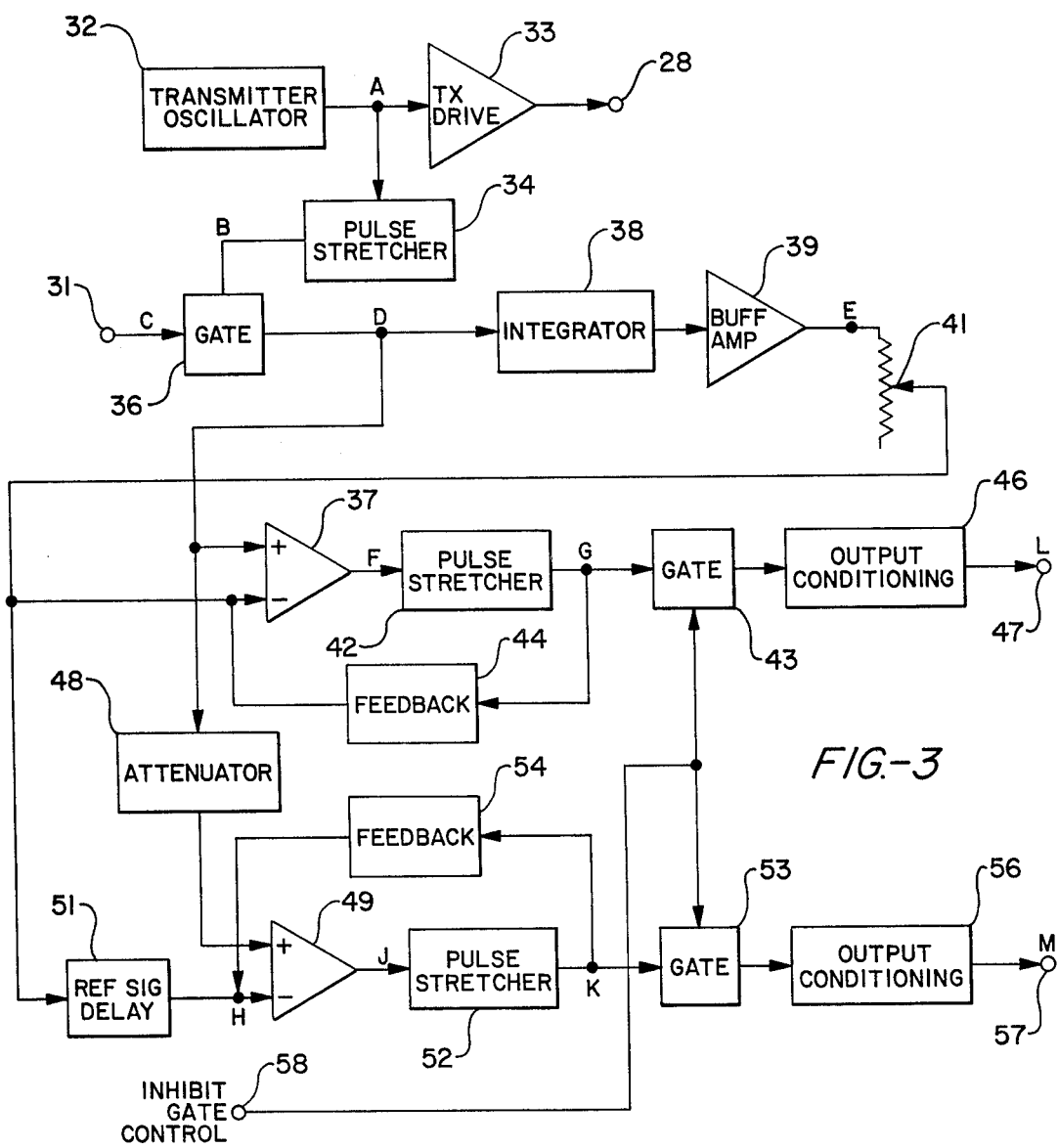
FIG. 3 is a block diagram of the color mark detector.

The block diagram of FIG. 3 shows a transmitter oscillator 32 which provides a pulsed output connected to a transmitter driver 33 and also to a pulse stretcher 34. Transmitter driver 33 is seen to be connected to terminal 28 for driving light source 14. Pulse stretcher 34 provides a pulse having a predetermined dwell time, which is synchronous with the output from transmitter oscillator 32 for energizing a gate 36. Gate 36 passes sensor output to the input of a dark comparator 37 and an integrator 38. An integral output is provided by integrator 38 and connected to the input of a buffer amplifier 39 providing a buffered output similar to the integral output to a sensitivity adjust device such as potentiometer 41. The buffered integral output adjusted to achieve a predetermined sensitivity is connected to another input terminal of dark comparator 37 which produces an output therefrom when a predetermined difference in levels between the gated sensor signal and the sensitivity adjusted integral output exists. A pulse stretcher 42 receives the output from dark comparator 37, producing a stretched output which is connected to a gate 43 and through a feedback path 44 to one of the inputs of comparator 37. Feedback path 44 is connected to the input terminal receiving the buffered integral output, which is utilized as the reference signal for comparator 37 in this embodiment. The feedback signal enhances the predetermined difference in levels between the integral and gated outputs to that comparator output is latched at a particular comparator output state when comparative magnitudes of the inputs to comparator 37 change polarity.

The output from pulse stretcher 42 is gated through gate 43 to an output conditioning circuit 46 which provides a dark mark detection output at output terminal 47.

The gated sensor output is also connected to an attenuator 48 which connects the attenuated gated sensor output to one input of a second or light comparator 49. The buffered integral output adjusted at sensitivity potentiometer 41 is connected to a reference signal delay circuit 51 which provides a delayed reference output to the other input of second comparator 49. Second comparator 49 provides an output to a second pulse stretcher 52 which provides a second stretched pulse connected both to a gate 53 and to a feedback path 54 connected to the reference input on second comparator 49. The output from gate 53 is connected to an output conditioning circuit 56 for producing a light mark detector output at terminal 57. An inhibit control terminal 58 is provided, connected to both gates 43 and 53 for inhibiting the dark and light mark output signals.

Figure 4:
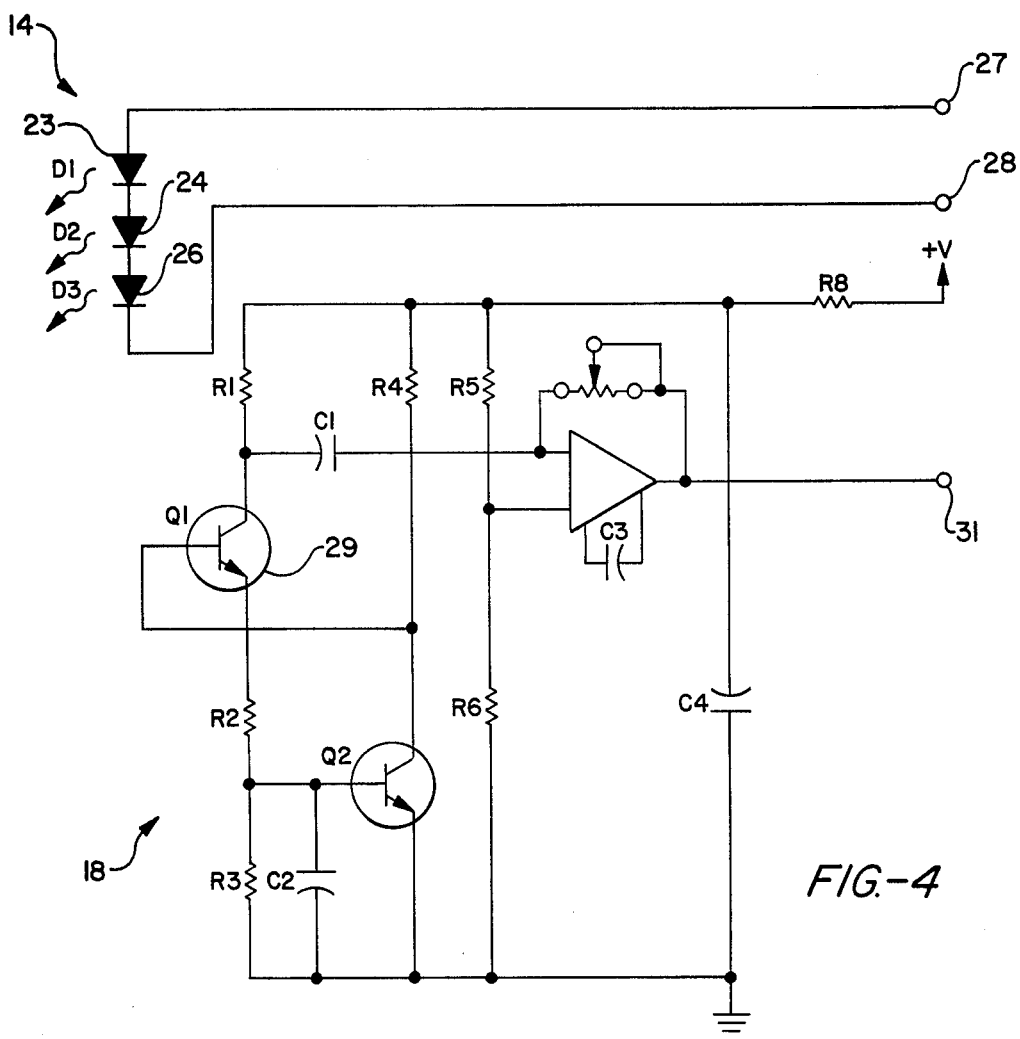
FIG. 4 is an electrical schematic including the light source and light sensor in the color mark detector.

FIG. 4 is a schematic showing light source 14 containing three LED devices 23, 24 and 25 having different light output wavelengths, or colors. The resulting light beam 16 therefore has different light emission wavelengths contained therein, whereby the light beam 16 is a multiple wavelength beam having characteristics approaching the characteristics of a white light beam. In this fashion a colored surface having colored marks thereon always reflects some component wavelength contained in light beam 16 to impinge upon light receiver 13 and produce a signal therefrom. As described above, semiconductor light source 14 is energized by applying appropriate power to terminals 27 and 28.

FIG. 4 also shows the circuit associated with pulsed light receiver 13. Since pulsed light receiver 13 and associated circuit 18 is described in detail in U.S. Pat. No. 3,867,628 mentioned above it will not be described in detail again here. It is sufficient to say that light received in that portion of light beam 16 reflected as reflected light beam 22 impinges on photosensitive device 29 to produce an output indicative of the intensity level of the light in the reflected light beam 22 and produces an output signal indicative of the intensity level at terminal 31.

Figure 5:
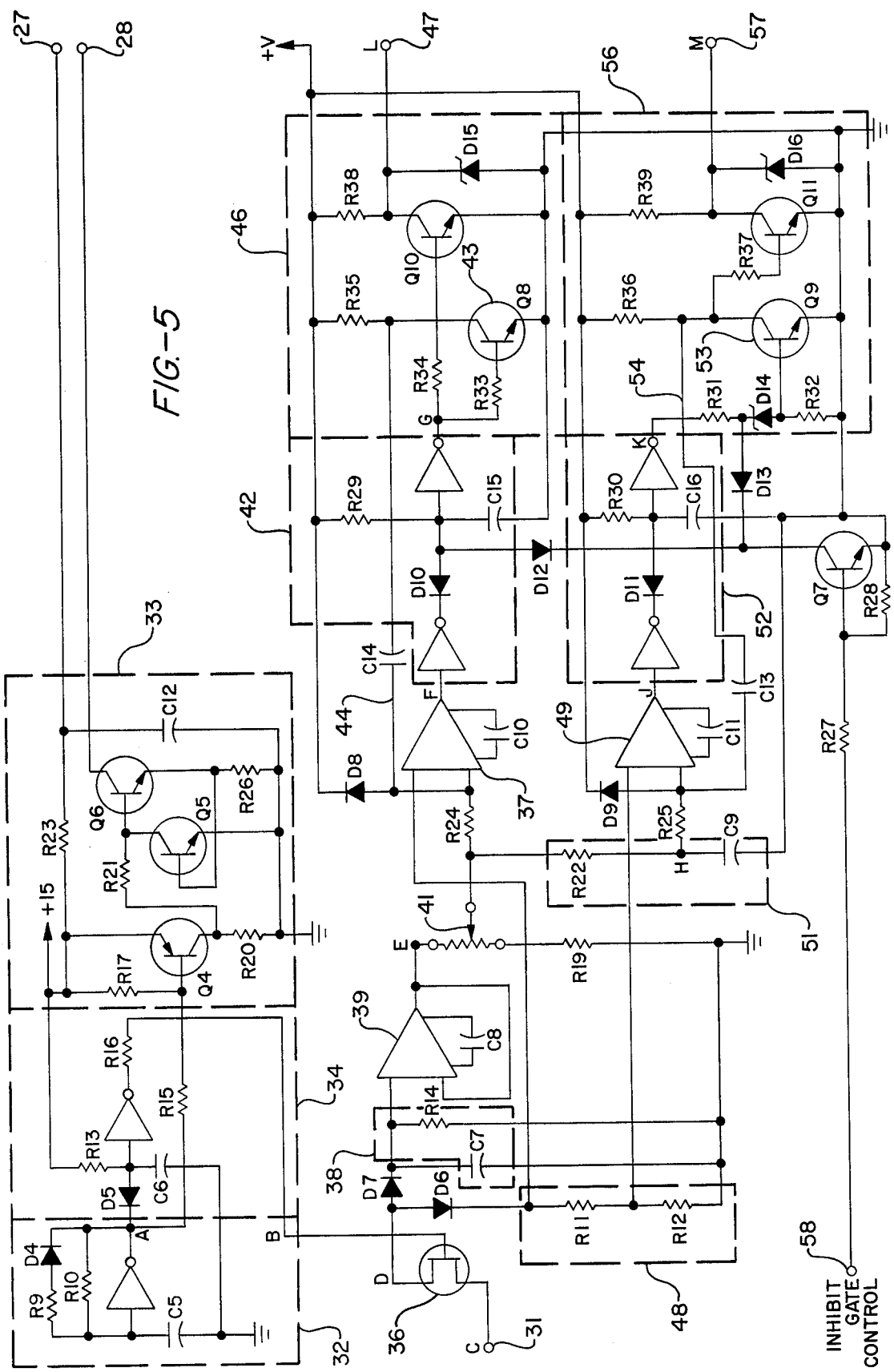
FIG. 5 is an electrical schematic of circuitry included in the color mark detector.

FIG. 5 shows the detection circuit which includes a transmitter oscillator circuit 32 having a periodic output connected to pulse stretcher 34. A stretched pulse is provided by pulse stretcher 34 which has a sufficient width to provide a predetermined gating period, and is therefore connected to control gate 36. Transmitter oscillator 32 is also connected to transmitter driver 33 for driving light source 14 through terminals 27 and 28 at a pulsed frequency determined by the output frequency of transmitter oscillator 32.

The output from light receiver associated circuit 18 is connected to the source of gate 36, shown as a field effect transistor herein. The output from light receiver circuit 18 is therefore gated through diode D6 to the input of comparator 37 and through diode D7 to integrator circuit 38 shown here as including capacitor C7 and resistor R14. The gated pulse eliminates all noise between pulses. The integral output of circuit 38, which is in the nature of a charge integrator, is connected to the input of buffer amplifier 39 for isolating the integral output from the input of comparator 37. Sensitivity potentiometer 41 is adjustable to increase or decrease sensitivity to dark and light marks on a contrasting background on surface 19. The buffered, integral output adjusted for sensitivity is connected to a separate input of comparator 37 for providing an output therefrom when the gated output exceeds the integral output by a predetermined amount. Pulse stretcher 42 stretches the output of comparator 37 by an amount of time in excess of one period of the pulsed frequency output from transmitter oscillator 32 but less than two such periods. In this fashion if pulses continue to appear at the output of comparator 37 due to the continuous comparison between the gated output and the integral output, the output of pulse stretcher 42 is maintained in one state. If a pulse is missed at the output of comparator 37, the pulse stretcher 42 times out and the state of pulse stretcher 42 changes. It may be seen by reference to FIG. 5 that if the comparator 37 misses a pulse, and the output of pulse stretcher 42 drops, transistor Q8 will turn off causing a positive pulse to be fed back through feedback path 44 including capacitor C14 to the reference input of comparator 37. Transistor Q10 will also be turned off and terminal 47 will assume a pulse voltage state.

The buffered integral output adjusted for sensitivity is also connected to the reference input terminal of comparator 49. An output is obtained from comparator 49 when the gated sensor output is greater than the level of the reference. Since the gated sensor output would always be greater than the signal at the reference input of comparator 49 due to the attenuation through sensitivity adjustment potentiometer 41 and other portions of the circuitry, the gated sensor output must be attenuated in attenuation circuit 48 including resistors R11 and R12 before being connected to the input of comparator 49. The input to the reference terminal of comparator 49 is also delayed in time so that an initial increase in gated sensor output will show as greater level in comparison to the reference level at comparator 49, thereby indicating a change toward a light color on the surface 19 being swept by light beam 14. The time delay of the reference for comparator 49 provides further reason for the need for attenuating the gated sensor output connected to comparator 49.

Much as for the dark mark comparator 37 above, light mark comparator 49 produces an output when the attenuated gate sensor output exceeds the level of the time delayed integral output. Pulse stretcher 52 again provides a stretched pulse which exceeds one period of the pulse frequency from transmitter oscillator 32 but does not exceed two periods. The output from pulse stretcher 52 is connected to light output conditioning circuit 56 so that when pulse stretcher output rises transistor Q9 is turned on and a negative spike is connected through feedback path 54 and capacitor C13 to the reference terminal of comparator 49. As transistor Q9 is turned on, transistor Q11 is turned off providing a rising signal at terminal 57 indicative of the passing of a portion of surface 19 which is lighter in comparison to the previous background color on the surface 19. An inhibit gate Q7 is turned on by a signal applied to terminal 58 which prevents transistor Q9 from being turned on by the output from the pulse stretcher 52, thereby inhibiting the light surface color output at terminal 57. When transistor Q7 is turned on it also holds the anode of diode D12 at a low potential, therefore holding the output of pulse stretcher 42 up and thereby inhibiting any output at dark surface output terminal 47.

The foregoing has described the interconnection of the various circuit components with only brief reference to the signal states existing in sequence throughout the circuit for providing the desired outputs for either dark or light portions of surface 19 passing through the light beam 14 and causing a commensurate amount of light to be reflected in reflected light beam 22. Making reference to FIG. 6 a string of negative going pulses 59 is shown on line A which may have about a ten microsecond dwell time and a period of 200 microseconds. This is the output of transmitter oscillator 32 which is utilized to drive the multiple LED light source 14 and is also connected to pulse stretcher 34. The output from pulse stretcher 34 is seen on line B as positive going pulses 61 which have a dwell time sufficient to turn on gate 36 to allow sensor output pulses 61 seen at line C and appearing at terminal 31 to be gated through to the integrating circuit 38 and one input terminal of comparator 37. Note that between pulses 62 an appreciable amount of noise 63 is present. Noise 63 is therefore eliminated by the gating at gate 36 and is absent at line D of FIG. 6.

The first pulse 62 on line C has an amplitude indicating a particular color on surface 19. The second pulse 62 on line C indicates that the surface 19 is darker comparatively than it was during the first pulse 62. The third pulse 62 on line C indicates the surface is comparatively lighter than it was during either the first or the second pulses 62. These amplitudes are seen to be repeated on line D of FIG. 6. While noise between pulses 62 on line C is eliminated, as may be seen by the gated pulse train of line D, any noise on pulses 62 themselves will be gated through with the pulses.

Integrating circuit 38 is shown in FIG. 5 as including parallel connected capacitor C7 and resistor R14. These components are chosen to afford a relatively long time constant compared to the pulse repetition rate of transmitter oscillator 32. For example a four millisecond time constant may be utilized in integrating circuit 38, which would provide an integral output seen at 64 on line E of FIG. 6. The signal form of line E is repeated at the output of buffer amplifier 39 and at the reference input of comparator 37. Thus, a DC level related to the peak gated sensor output pulses is provided at the reference input of comparator 37. Comparator output pulses are provided whenever the gated sensor output pulses 62 exceed the DC level 64 of E.

The output of comparator 37 is seen at line F as the pulses 66. Pulses 66 exist as long as pulses 62 are greater than the adjusted level 64. The second pulse 62 on line D is seen to be less than the adjusted level 64 at line E and therefore no pulse 66 appears at that time on line F. Consequently, pulse stretcher 42 times out in approximately three hundred microseconds and the output 67 therefrom drops as seen at line G. Pulse stretcher 42 times out in a period longer than the period of the pulse frequency from transmitter oscillator 32, but shorter than two periods thereof. As explained above, when the output from pulse stretcher 42 drops, Q8 is turned off and a positive pulse 68 is connected through feedback path 44 and capacitor C14 to the reference input of comparator 37. Pulse 68 is superimposed on the referenced input 64 and temporarily latches comparator 37 in the off positive so that noise on the leading edge of gated output 62 will not cause fluctuation in the output of comparator 37 and subsequent noise on the dark mark output at terminal 47.

Transistor Q10 is turned off at the same time as transistor Q8 and terminal 47 is therefore seen to rise as indicated on line L to provide dark mark output 69. When pulse 62 again exceeds the level of the reference at comparator 37 as seen in the third pulse 62 on line D, comparator 37 again produces a pulse output 66 which is stretched by pulse stretcher 42 as shown on line G at 67. The leading edge of the signal 67 produces a negative going pulse 71 coupled through feedback path 44 and capacitor C14 to the reference terminal on comparator 37 for temporarily latching the comparator 37 to produce output pulse 66. Again the feedback pulse 71 is superimposed on the reference input 64 to assure that gated output 62 is greater than reference 64 for producing comparator output 66. The rise of signal 67 at the output of pulse stretcher 42 also turns on transistor Q10 dropping terminal 47 to ground level and terminating dark output 69 at terminal 47. Therefore the dark output at terminal 47 is initiated by an absence of pulses 66, which means a comparative decrease in the gated sensor output signal 62, which means a dark area on surface 19 is passing before light sensor 13.

Figure 6:
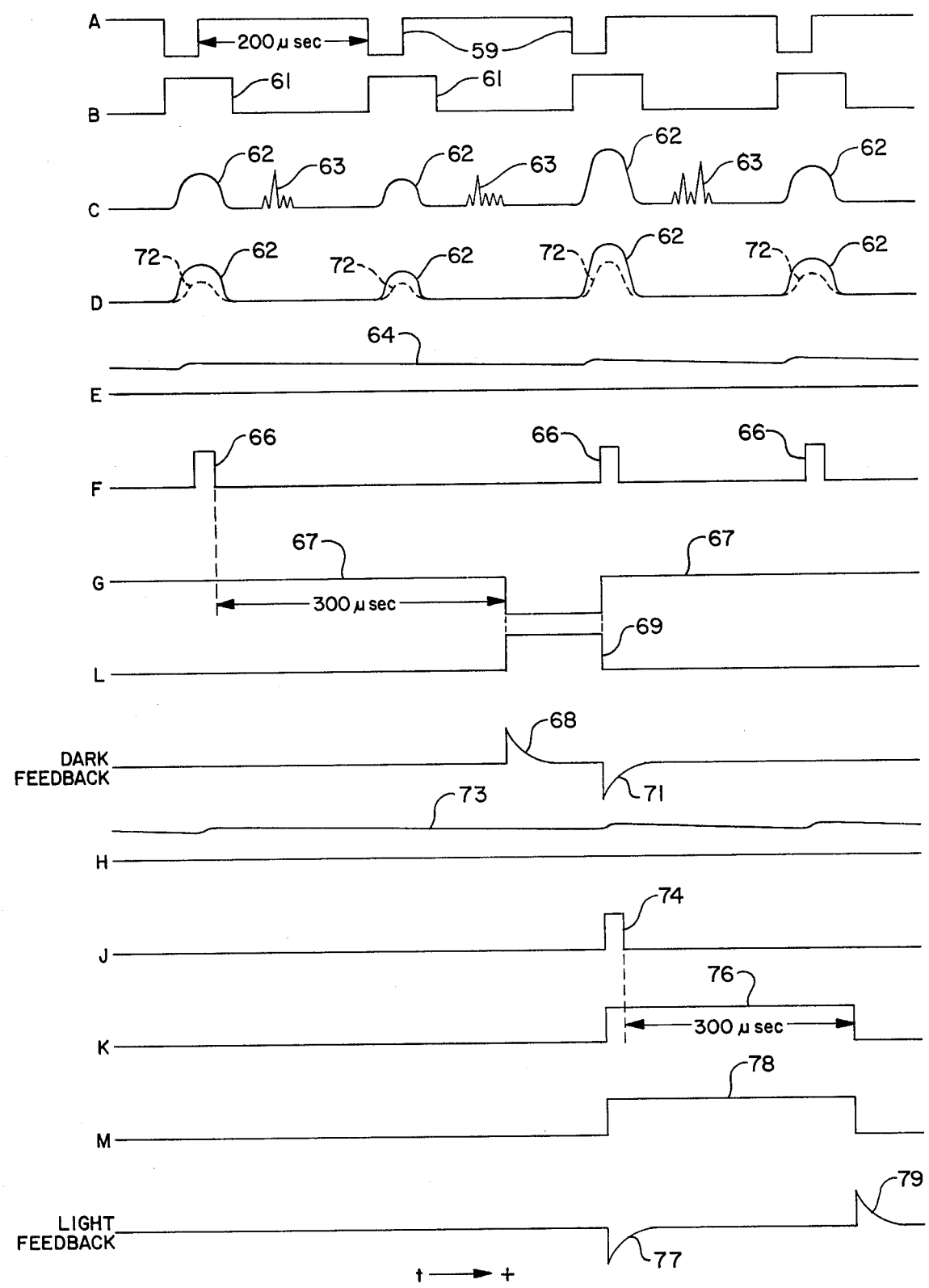
FIG. 6 is a timing diagram of the signals in the circuits of the color mark detector.

When a light mark passes before light sensor 13 on surface 19, an increase in the gated sensor output signal 62 will occur as may be seen in the third pulse 62 on line D of FIG. 6. As discussed above, the output pulses 66 from comparator 37 will continue and no output will be seen at terminal 47. However, an attenuated sensor output pulse 72 seen at line D is produced by attenuator 48 and connected to one input terminal of comparator 49. The reference terminal at comparator 49 is connected to a time delay circuit including capacitor C9 and resistor R22. Thus, signal 64 seen on line E of FIG. 6 is transformed to appear as the DC level 73 seen on line H of FIG. 6. At the point in time that attenuated gated sensor pulse 72 occurs in the third position from the left on line D of FIG. 6, it may be seen that pulse 72 is greater than the DC level 73 at the reference input to comparator 49. Consequently, comparator 49 will produce an output 74 as seen at line J which will actuate pulse stretcher 52 to produce output 76. The output of pulse stretcher 52, much as pulse stretcher 42, is designed to exist for more than one period of the pulse frequency from transmitter oscillator 32 but not as long as two periods therefrom. Consequently, after one pulse 74 is absent from the output of comparator 49, the output 76 from pulse stretcher 52 times out and once again resumes a low state.

When the output 76 from pulse stretcher 52 rises, transistor Q9 is turned on and a negative pulse 77 is fed back through feedback path 54 and capacitor C13 to the reference input terminal of 49. This negative pulse 77 is superimposed on reference input 73 to latch the output from comparator 49 in an up state as indicated at 74 on line J of FIG. 6. When transistor Q9 is turned on, transistor Q11 is turned off and light mark output terminal 57 produces output 78 seen at line M in FIG. 6. When pulse stretcher 52 times out and the output therefrom drops to a low state, transistor Q9 is turned off producing a positive pulse 79 through feedback path 54 and capacitor C13 to the reference input of comparator 49. Positive pulse 79 is superimposed on reference input 73 to comparator 49 to latch the output 74 therefrom in the off condition. When Q9 is turned off signal 76 falls to a low state, Q11 is turned on by a rising voltage at the base thereof, and light mark output 78 falls. Consequently, output pulses from comparator 49 exist as long as the attenuated gated sensor output 72 is greater than the time delayed reference level input to comparator 49. This only occurs when a light portion passes before sensor 13 on surface 19 to produce an increase in the gated sensor output 72 which is sufficient to exceed the time delayed reference input.

The device disclosed above has produced a 0.5 volt change as a result of a red mark on a green background. Prior art devices have been observed to produce a maximum of 30 millivolts change under such conditions, and frequently will produce no signal at all. A color mark detector has been disclosed herein which provides automatic adjustment in threshold at the comparators for producing output indicative of passage of a dark mark on a light background and for producing output indicative of passage of a light mark on a dark background.

What is claimed is:

1. A method for detecting a mark on a surface having a contrasting background comprising the steps of projecting a pulsing multiwavelength component light beam toward the surface, sensing the intensity of light pulses reflected from the surface, producing sensing signals corresponding to the intensity of said light pulses, producing integrated signals from said sensing signals, producing time delayed reflected light pulse intensity signals from the integrated signals, comparing the sensed and time delayed signals, producing a dark mark output for sensed signals corresponding to lower intensity than those compared time delayed signals, and producing a light mark output for sensed signals corresponding to higher intensity than those compared time delayed signals.

2. A method as in claim 1 together with the step of latching the comparison results temporarily each time the dark and light mark outputs change, whereby noise in the comparison threshold is barred from the outputs.

3. A method according to claim 1 including the step of attenuating said sensed signals prior to said comparing step.

* * * * *